S. Merrick,
Wrench.
RX38
No 38.
Reissued May 17, 1842.
9030X RELATED DOC
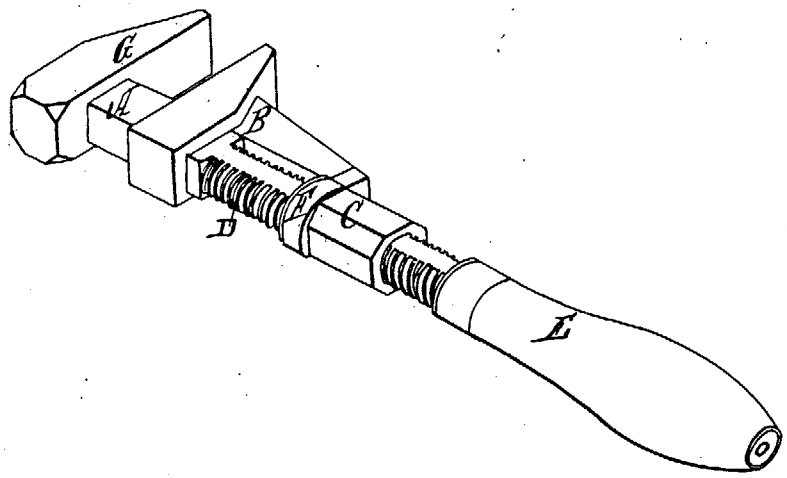

Rx 38

UNITED STATES PATENT OFFICE.

SOLYMAN MERRICK, OF SPRINGFIELD, MASSACHUSETTS.

IMPROVEMENT IN SCREW-WRENCHES.

Related Doc 9030X

Specification forming part of Letters Patent dated August 17, 1835; Reissue No. 38, dated May 17, 1842.

*To all whom it may concern:*

Be it known that I, SOLYMAN MERRICK, of Springfield, in the county of Hampden and State of Massachusetts, have invented an Improvement in Screw-Wrenches; and I do hereby declare that the following is a full and exact description.

The nature and object of my invention is as follows, to wit: The making the screw upon two circular edges of the main bar of the wrench, for the purpose of allowing greater strength to the main bar in the direction in which it is most needed, and thereby avoid the necessity of making the bar, and consequently the jaws of the wrench, thicker and heavier than a due proportion of strength requires with reference to the uses for which the wrench is intended, and also to give the dirt or rust which may collect within the nut an opportunity to escape through the apertures between the threads of the nut and the flat sides of the screw. It also consists in combining the nut and slide-jaw in such a manner that the turning the nut will cause both nut and slide-jaw to move either backward or forward upon the main bar independent of the handle.

To enable others skilled in the art to make and use my improvement, I will proceed to describe its construction and operation.

I make the main bar of the wrench of iron, at one end of which I form a head, which constitutes the stationary jaw of the wrench. From this stationary jaw, and at right angles with it, I make the main bar of such proportions that its cross-section represents a parallelogram whose diameters are about as five to seven, the direction of the greater diameter corresponding with the jaws of the wrench. This part of the main bar I make a little longer than the slide-jaw is required to open, which jaw I make to fit this part of the main bar.

From the part of the main bar to which the slide-jaw is fitted I turn the edges of the bar to a diameter a little less than the greater diameter of the main bar, and of a length sufficient to receive the nut in addition to the distance required for the sliding jaw to open, and upon these circular edges of the bar I cut a double-thread screw. I fit a nut to this screw, which nut I connect to the slide-jaw by means of a collar and groove at the end of the nut, which take into corresponding grooves at the end and underneath the slide-bar. The nut and slide-bar are held together by a strap, which passes around in the groove on the nut and is riveted to the sides of the slide-bar in such a manner that the nut may turn easily around. The part of the nut which extends back from the groove toward the handle I make an octagon, and of sufficient length to be turned round by the hand. From the screw I make the main bar of suitable size and proportions and of sufficient length to pass through the handle, which handle is driven on and held in its place by a screw and nut.

It will be seen by the foregoing arrangement that by turning the nut the slide-jaw will move in either direction, and may be set to any desired point on the bar.

What I claim as my invention, and desire to secure by Letters Patent, is—

The arrangement of the screw upon the two circular edges of the main bar in the manner and for the purpose herein described; also, the combining the nut and slide-jaw in the manner and for the purpose herein described.

SOLYMAN MERRICK.

Witnesses:

R. A. CHAPMAN,

LORENZO NORTON.